United States Patent
Belrose (10) Patent No.: US 7,593,854 B2
(45) Date of Patent: Sep. 22, 2009

(54) METHOD AND SYSTEM FOR COLLECTING USER-INTEREST INFORMATION REGARDING A PICTURE

(75) Inventor: Guillaume Belrose, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1333 days.

(21) Appl. No.: 10/313,869

(22) Filed: Dec. 6, 2002

(65) Prior Publication Data

US 2003/0144843 A1 Jul. 31, 2003

(30) Foreign Application Priority Data

Dec. 13, 2001 (GB) .................................. 0129787.8

(51) Int. Cl.
*G10L 21/00* (2006.01)

(52) U.S. Cl. .................. 704/270.1; 704/270; 345/619; 345/620; 345/621; 345/622; 345/623; 345/624; 345/625; 345/626; 382/282; 715/512

(58) Field of Classification Search ......... 345/619–626; 382/282; 715/512; 704/270, 270.1
See application file for complete search history.

(56) References Cited

U.S. PATENT DOCUMENTS

| | | | | |
|---|---|---|---|---|
| 5,737,491 | A * | 4/1998 | Allen et al. .................. | 704/270 |
| 6,012,030 | A | 1/2000 | French-St. George et al. .... | 704/275 |
| 6,070,167 | A | 5/2000 | Qian et al. .................. | 707/102 |
| 6,076,104 | A | 6/2000 | McCue ........................ | 709/219 |
| 6,324,545 | B1 * | 11/2001 | Morag ........................ | 707/202 |
| 6,339,431 | B1 * | 1/2002 | Ohmori et al. ............... | 345/619 |
| 6,366,909 | B1 * | 4/2002 | Yuasa et al. .................... | 707/4 |
| 6,373,499 | B1 * | 4/2002 | Acker ......................... | 345/619 |
| 6,392,658 | B1 * | 5/2002 | Oura .......................... | 345/629 |
| 6,504,571 | B1 * | 1/2003 | Narayanaswami et al. ....................... | 348/231.99 |
| 6,538,666 | B1 | 3/2003 | Ozawa et al. ................ | 715/728 |
| 6,570,555 | B1 | 5/2003 | Prevost et al. .............. | 345/156 |
| 6,600,502 | B1 | 7/2003 | Brewster .................... | 715/854 |
| 6,654,506 | B1 * | 11/2003 | Luo et al. ................... | 382/282 |
| 6,687,383 | B1 | 2/2004 | Kanevsky et al. ........... | 382/100 |
| 6,721,001 | B1 * | 4/2004 | Berstis ..................... | 348/231.3 |
| 6,810,146 | B2 * | 10/2004 | Loui et al. .................. | 382/173 |
| 6,906,730 | B2 * | 6/2005 | Bossut et al. ............... | 345/629 |
| 6,945,217 | B2 * | 9/2005 | Makler ........................ | 123/241 |
| 6,959,122 | B2 * | 10/2005 | McIntyre .................... | 382/305 |

(Continued)

FOREIGN PATENT DOCUMENTS

GB 2 356 115 A 5/2001

(Continued)

*Primary Examiner*—David R Hudspeth
*Assistant Examiner*—Jakieda R Jackson (57) ABSTRACT

A user is presented with a picture image either in hard-copy or electronic form. Particular picture features in the image each have associated information that is presented to the user upon the user requesting such information by at least selecting the picture feature using a feature-selection arrangement. Should the user select a picture feature for which no information is provided, an identifier of the feature, for example its image coordinates, are output to inform a person involved in providing the picture and related information. Preferably, to request information about a picture feature, the user as well as selecting the feature, also inputs a query by voice; in this case, where the selected feature has no associated information, the user query is also provided back to the person involved in providing the picture and related information.

27 Claims, 6 Drawing Sheets

U.S. PATENT DOCUMENTS

| | | | |
|---|---|---|---|
| 6,976,229 B1 * | 12/2005 | Balabanovic et al. | 715/838 |
| 7,010,144 B1 * | 3/2006 | Davis et al. | 382/100 |
| 7,028,253 B1 * | 4/2006 | Lieberman et al. | 715/512 |
| 7,119,814 B2 * | 10/2006 | Meron et al. | 345/619 |
| 2002/0010584 A1 | 1/2002 | Schultz et al. | 704/270 |
| 2002/0031754 A1 | 3/2002 | Spector | 434/323 |
| 2002/0038226 A1 * | 3/2002 | Tyus | 705/2 |
| 2002/0075282 A1 * | 6/2002 | Vetterli et al. | 345/632 |
| 2002/0158129 A1 * | 10/2002 | Hu | 235/462.11 |
| 2003/0117385 A1 * | 6/2003 | Itoh et al. | 345/204 |
| 2004/0207600 A1 * | 10/2004 | Zhang et al. | 345/156 |

FOREIGN PATENT DOCUMENTS

| | | |
|---|---|---|
| WO | 00/49532 | 8/2000 |
| WO | 01/75667 A1 | 10/2001 |

* cited by examiner

METHOD AND SYSTEM FOR COLLECTING USER-INTEREST INFORMATION REGARDING A PICTURE

FIELD OF THE INVENTION

The present invention relates to a method and system for collecting user-interest information regarding a picture particularly, but not exclusively, where the picture is a multimodal picture with which a use can interact by spoken dialog exchanges.

BACKGROUND OF THE INVENTION

In recent years there has been an explosion in the number of services available over the World Wide Web on the public internet (generally referred to as the "web"), the web being composed of a myriad of pages linked together by hyperlinks and delivered by servers on request using the HTTP protocol. Each page comprises content marked up with tags to enable the receiving application (typically a GUI browser) to render the page content in the manner intended by the page author; the markup language used for standard web pages is HTML (HyperText Markup Language).

However, today far more people have access to a telephone than have access to a computer with an Internet connection. Sales of cellphones are outstripping PC sales so that many people have already or soon will have a phone within reach where ever they go. As a result, there is increasing interest in being able to access web-based services from phones. 'Voice Browsers' offer the promise of allowing everyone to access web-based services from any phone, making it practical to access the Web any time and any where, whether at home, on the move, or at work.

Figure 1:
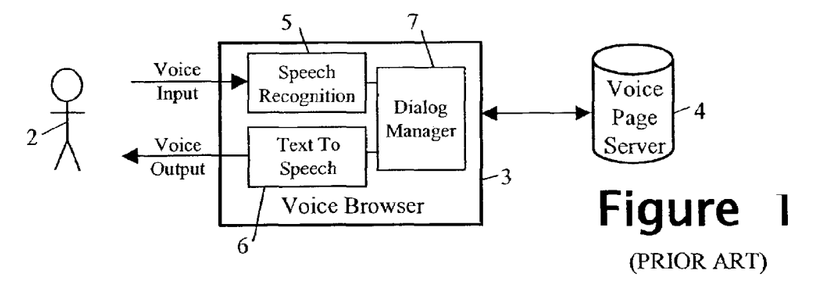
FIG. 1 is a diagram illustrating the role of a voice browser.

Voice browsers allow people to access the Web using speech synthesis, pre-recorded audio, and speech recognition. FIG. 1 of the accompanying drawings illustrates the general role played by a voice browser. As can be seen, a voice browser is interposed between a user 2 and a voice page server 4. This server 4 holds voice service pages (text pages) that are marked-up with tags of a voice-related markup language (or languages). When a page is requested by the user 2, it is interpreted at a top level (dialog level) by a dialog manager 7 of the voice browser 3 and output intended for the user is passed in text form to a Text-To-Speech (TTS) converter 6 which provides appropriate voice output to the user. User voice input is converted to text by speech recognition module 5 of the voice browser 3 and the dialog manager 7 determines what action is to be taken according to the received input and the directions in the original page. The voice input/output interface can be supplemented by keypads and small displays.

In general terms, therefore, a voice browser can be considered as a largely software device which interprets a voice markup language and generate a dialog with voice output, and possibly other output modalities, and/or voice input, and possibly other modalities (this definition derives from a working draft, dated September 2000, of the Voice browser Working Group of the World Wide Web Consortium).

Voice browsers may also be used together with graphical displays, keyboards, and pointing devices (e.g. a mouse) in order to produce a rich "multimodal voice browser". Voice interfaces and the keyboard, pointing device and display maybe used as alternate interfaces to the same service or could be seen as being used together to give a rich interface using all these modes combined.

Some examples of devices that allow multimodal interactions could be multimedia PC, or a communication appliance incorporating a display, keyboard, microphone and speaker/headset, an in car Voice Browser might have display and speech interfaces that could work together, or a Kiosk.

Some services may use all the modes together to provide an enhanced user experience, for example, a user could touch a street map displayed on a touch sensitive display and say "Tell me how I get here?". Some services might offer alternate interfaces allowing the user flexibility when doing different activities. For example while driving speech could be used to access services, but a passenger might used the keyboard.

Figure 2:
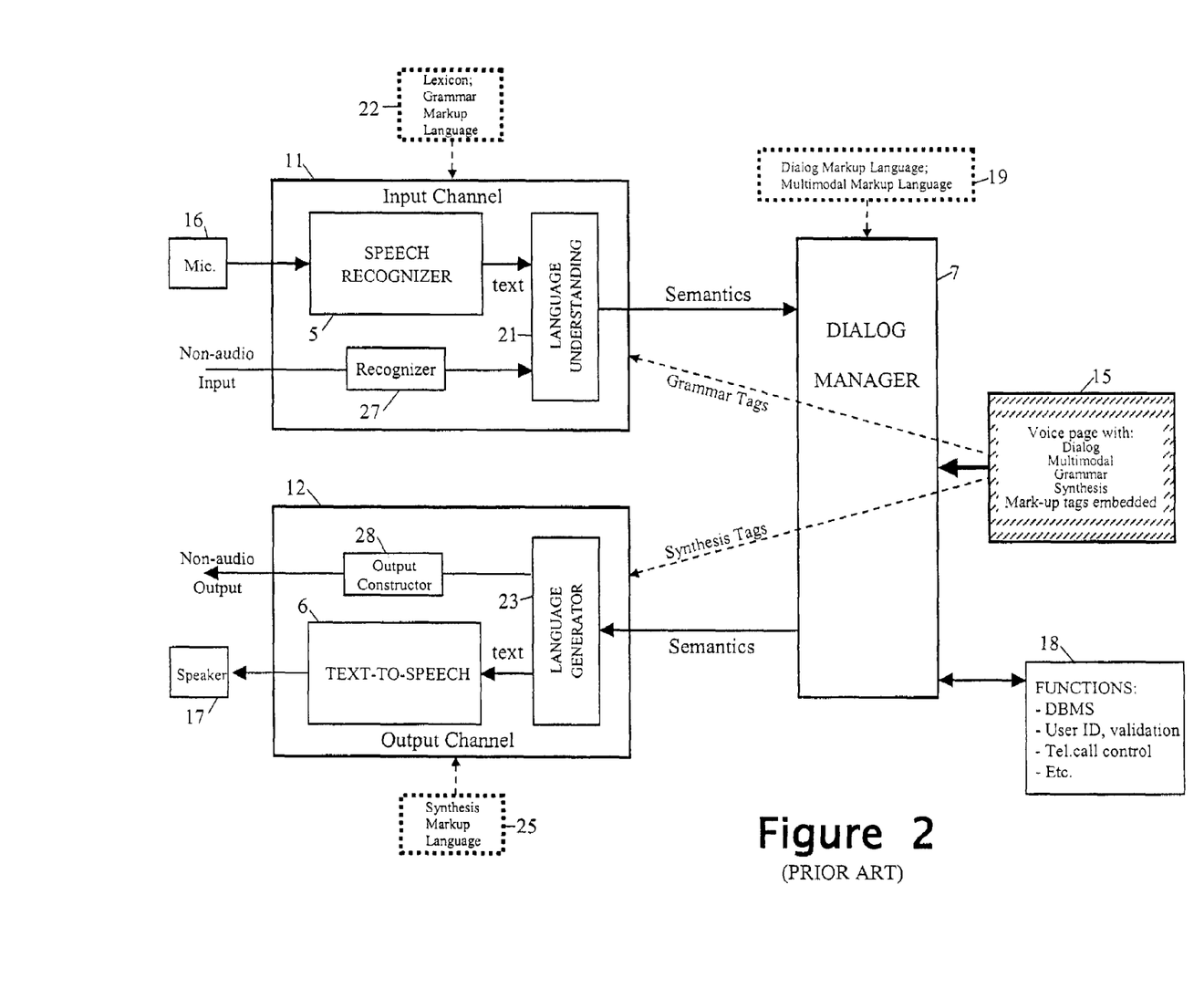
FIG. 2 is a diagram showing the functional elements of a voice browser and their relationship to different types of voice markup tags.

FIG. 2 of the accompanying drawings shows in greater detail the components of an example voice browser for handling voice pages 15 marked up with tags related to four different voice markup languages, namely:

tags of a dialog markup language that serves to specify voice dialog behaviour;

tags of a multimodal markup language that extends the dialog markup language to support other input modes (keyboard, mouse, etc.) and output modes (large and small screens);

tags of a speech grammar markup language that serve to specify the grammar of user input; and tags of a speech synthesis markup language that serve to specify voice characteristics, types of sentences, word emphasis, etc.

When a page 15 is loaded into the voice browser, dialog manager 7 determines from the dialog tags and multimodal tags what actions are to be taken (the dialog manager being programmed to understand both the dialog and multimodal languages 19). These actions may include auxiliary functions 18 (available at any time during page processing) accessible through APIs and including such things as database lookups, user identity and validation, telephone call control etc. When speech output to the user is called for, the semantics of the output is passed, with any associated speech synthesis tags, to output channel 12 where a language generator 23 produces the final text to be rendered into speech by text-to-speech converter 6 and output to speaker 17. In the simplest case, the text to be rendered into speech is fully specified in the voice page 15 and the language generator 23 is not required for generating the final output text; however, in more complex cases, only semantic elements are passed, embedded in tags of a natural language semantics markup language (not depicted in FIG. 2) that is understood by the language generator. The TTS converter 6 takes account of the speech synthesis tags when effecting text to speech conversion for which purpose it is cognisant of the speech synthesis markup language 25.

User voice input is received by microphone 16 and supplied to an input channel of the voice browser. Speech recogniser 5 generates text which is fed to a language understanding module 21 to produce semantics of the input for passing to the dialog manager 7. The speech recogniser 5 and language understanding module 21 work according to specific lexicon and grammar markup language 22 and, of course, take account of any grammar tags related to the current input that appear in page 15. The semantic output to the dialog manager 7 may simply be a permitted input word or may be more complex and include embedded tags of a natural language semantics markup language. The dialog manager 7 determines what action to take next (including, for example, fetching another page) based on the received user input and the dialog tags in the current page 15.

Any multimodal tags in the voice page 15 are used to control and interpret multimodal input/output. Such input/ output is enabled by an appropriate recogniser 27 in the input channel 11 and an appropriate output constructor 28 in the output channel 12.

Figure 3:
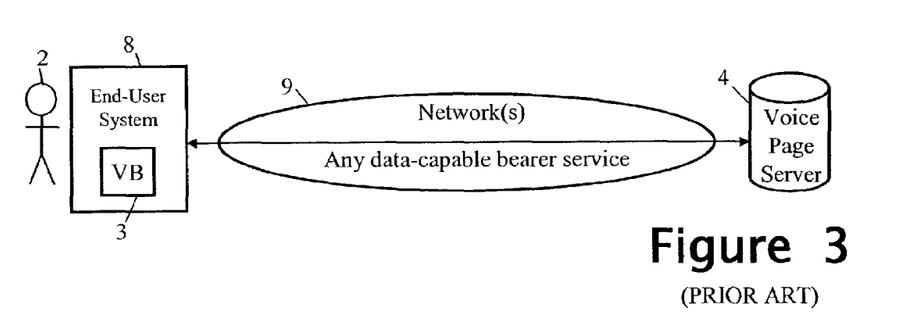
FIG. 3 is a diagram showing a voice service implemented with voice browser functionality located in an end-user system.
Figure 4:
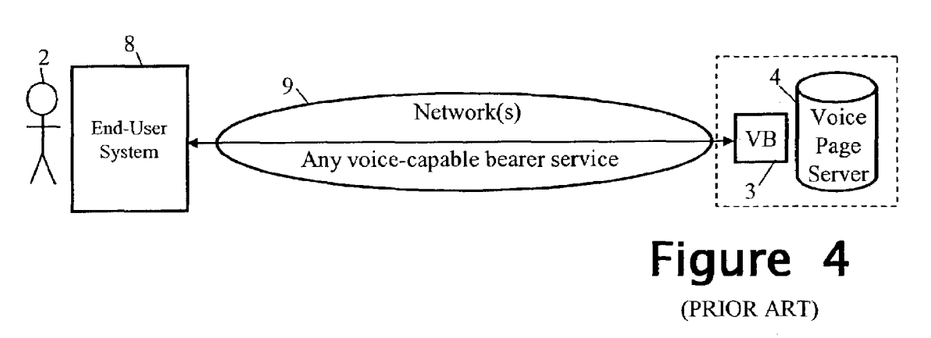
FIG. 4 is a diagram showing a voice service implemented with voice browser functionality co-located with a voice page server.
Figure 5:
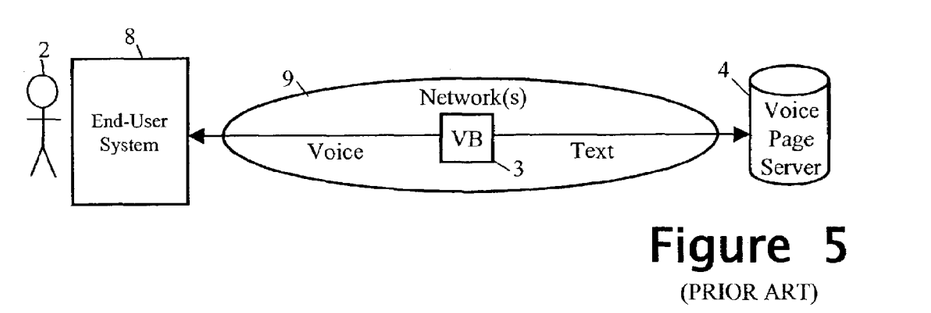
FIG. 5 is a diagram showing a voice service implemented with voice browser functionality located in a network between the end-user system and voice page server.

Whatever its precise form, the voice browser can be located at any point between the user and the voice page server. FIGS. 3 to 5 illustrate three possibilities in the case where the voice browser functionality is kept all together; many other possibilities exist when the functional components of the voice browser are separated and located in different logical/physical locations.

In FIG. 3, the voice browser 3 is depicted as incorporated into an end-user system 8 (such as a PC or mobile entity) associated with user 2. In this case, the voice page server 4 is connected to the voice browser 3 by any suitable data-capable bearer service extending across one or more networks 9 that serve to provide connectivity between server 4 and end-user system 8. The data-capable bearer service is only required to carry text-based pages and therefore does not require a high bandwidth.

FIG. 4 shows the voice browser 3 as co-located with the voice page server 4. In this case, voice input/output is passed across a voice network 9 between the end-user system 8 and the voice browser 3 at the voice page server site. The fact that the voice service is embodied as voice pages interpreted by a voice browser is not apparent to the user or network and the service could be implemented in other ways without the user or network being aware.

In FIG. 5, the voice browser 3 is located in the network infrastructure between the end-user system 8 and the voice page server 4, voice input and output passing between the end-user system and voice browser over one network leg, and voice-page text data passing between the voice page server 4 and voice browser 3 over another network leg. This arrangement has certain advantages; in particular, by locating expensive resources (speech recognition, TTS converter) in the network, they can be used for many different users with user profiles being used to customise the voice-browser service provided to each user.

It is known to enhance pictures by providing associated information such as speech annotations. It is an object of the present invention to facilitate the provision of user-relevant information for such pictures.

SUMMARY OF THE INVENTION

According to one aspect of the present invention, there is provided a method of collecting user-interest information regarding a picture, the method comprising the steps of:
(a) presenting a picture image to a user, particular picture features in the image each having associated information that is presented to the user upon the user requesting such information;
(b) recognising a user information request, in respect of a picture feature, made by the user at least selecting that picture feature using a feature-selection arrangement; and
(c) in response to recognition of a user information request in step (b) concerning a picture feature that is other than a said particular picture feature, outputting an identifier of the concerned picture feature independently of the presented image.

According to another aspect of the present invention, there is provided a system for collecting user-interest information regarding a picture, the system comprising:
- a data store for holding information concerning particular picture features;
- a feature-selection arrangement for enabling a user to select a feature in a displayed view of the picture, and for providing an output indication regarding what said particular feature, if any, the user has thereby selected;
- an information-output subsystem for outputting information about picture features to the user;
- a control arrangement for recognising a user information request, in respect of a picture feature, made by the user at least selecting that picture feature using the feature-selection arrangement, the control arrangement including:
  - first output means arranged to respond to a user making an information request concerning a said particular feature, by outputting the corresponding stored information via the information-output subsystem; and
  - second output means arranged to respond to a user making an information request concerning a picture feature that is other than a said particular picture feature, by outputting an identifier of the concerned picture feature for informing an author of the picture or its associated information regarding the unsatisfied information request.

BRIEF DESCRIPTION OF THE DRAWINGS

A method and apparatus embodying the invention will now be described, by way of non-limiting example, with reference to the accompanying diagrammatic drawings, in which.

BEST MODE OF CARRYING OUT THE INVENTION

In the following description, voice dialog interaction with a user is described based on a voice page server serving a dialog page with embedded voice markup tags to a multi-modal voice browser. Unless otherwise indicated, the foregoing description of voice browsers, and their possible locations and access methods is to be taken as applying also to the described embodiments of the invention. Furthermore, although voice-browser based forms of voice dialog services are preferred, the present invention in its widest conception, is not limited to these forms of voice dialog service system and other suitable systems will be apparent to persons skilled in the art.

Multi-Modal Picture

Figure 6:
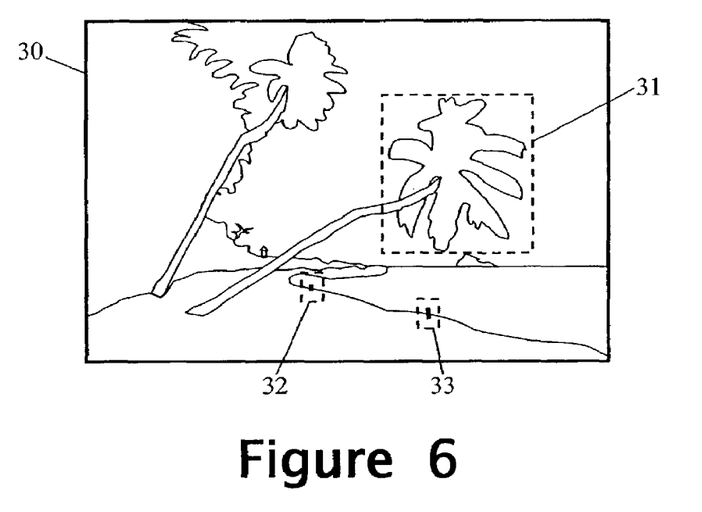
FIG. 6 shows an example picture image of a multi-modal picture.

FIG. 6 depicts a multi-modal picture comprising a displayed picture image 30 (here shown as being of a holiday island taken, for example, whilst the author of the picture was on holiday) with which a recipient (referred to below as the "user") can interact using multiple modalities and, in particular, by spoken dialogues and the use of a pointing arrangement, such as a cursor controlled by a mouse, stylus or keyboard keys, a touch-screen detection arrangement, etc. Thus, the user can query the picture using speech input, the query being either a general query about the picture or a specific query about a particular feature (item or area) of the picture indicated by use of the pointing arrangement (for example, the user uses a mouse to move a cursor over a picture feature and then clicks a mouse button). Of course, only certain picture features will have been set up to be queried and in the FIG. 6 example, there are three such features, namely a coconut tree 31, a first person 32, and a second person 33; the dashed boxes around these features represent the "hotspot" image areas set up to encompass the features, the dashed lines generally not being visible (though displaying a hotspot boundary can be used as one way of indicating the hotspot to the user—a more typical way would be, in the case of the pointing arrangement being a mouse-controlled cursor, to change the cursor image as it moved into and out of a hotspot).

Processing functionality associated with the multi-modal picture is arranged to recognize one or more one or more general queries and, for each picture feature set up for selection, one or more specific queries. For each query set to be recognized, there is a corresponding response which is output to the user when the query is recognized, this output generally being in spoken form, generated using either speech synthesis or pre-recorded audio content. Thus, for example:

General Queries—available general queries can include picture location, the date of the picture was taken, and a description of the general subject of the picture. For instance:

| | |
|---|---|
| User: | "Describe the picture" |
| System: | "This is a picture of the XYZ beach" |
| User: | "What is the date?" |
| System: | "The picture was taken November last year" |
| User: | "What is the location?" |
| System: | "XYZ beach is in Martinique, an island that is part of the French West Indies." |

(In this and other dialog examples given in the present specification, the "System" is the functionality used to present the multi-modal picture to the user and to provide for multi-modal interaction).

Specific Queries—typically, the same specific queries are available for all the selectable picture features; example specific queries are: "What it is?", "Any story?", etc. For instance:

| | |
|---|---|
| User: | "What is it"?" |
| System: | "This is my cousin John". |
| User: | "Any story?" |
| System: | "John goes fishing quite often in the Caribbean Sea. One day, he just escaped a white shark attack." |

The responses from the system can, of course, be more than just a simple single turn response and may involve a multi-turn structured dialog. Provision may also be made for different levels of content, for instance an initial level of public information and a lower level of private information only accessible under password control (or by some other security check procedure). Alternatively, there may be both a brief and a much fuller response.

A further possibility is to have responses from more than one narrator. Thus, a user can first obtain a response from one person associated with the picture and then a response from a different person also associated with the picture. For example, the user receives a picture from his/her parents. In the picture, the user's mother appears to be talking to someone, but the user's father looks bored. The user interaction might therefore proceed as follows:

| | |
|---|---|
| User: | "Mother, who is she?" [User uses pointing arrangement to indicate a person in the picture]. |
| System: | [In pre-recorded voice of user's mother] "This is my colleague from work. We had such a good time." |
| User: | "Father, can you please describe the picture?" |
| System: | [In pre-recorded voice of user's father] "We went to this rather boring evening with your mother's colleagues. They ended up talking about clothes all the time." |

From the foregoing general description of a multi-modal picture, it will be appreciated that the term "multi-modal picture" covers more than just the picture image and includes also the associated dialog and the behaviour of the picture in response to user input.

Example Implementation

Figure 7:
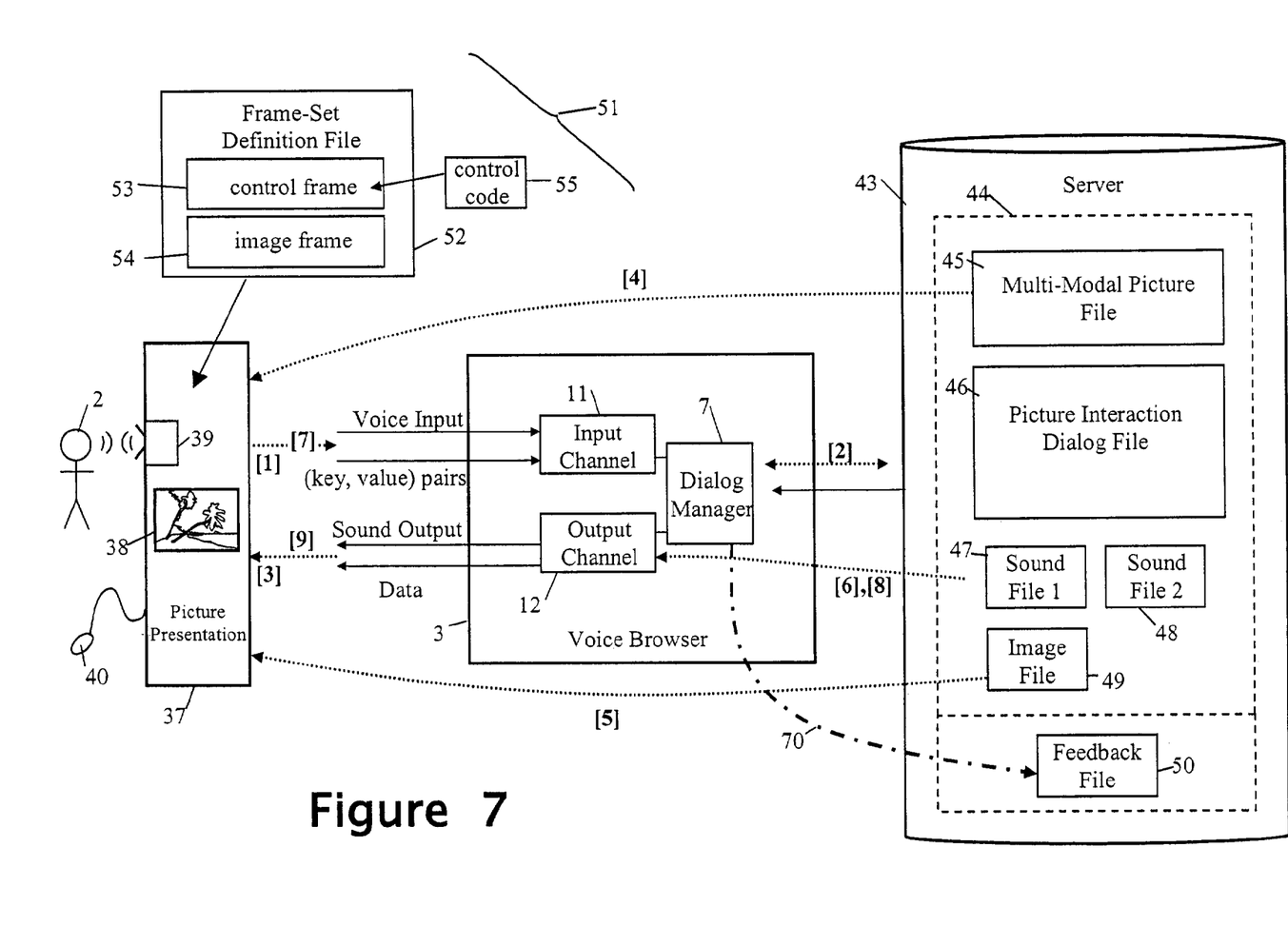
FIG. 7 is a diagram of a system for presenting a multi-modal picture to a user.

FIG. 7 depicts an example implementation of a system for presenting a multi-modal picture.

The multi-modal picture is specified by a set 44 of related files held on a server 43, these files specifying both the image associated with the multi-modal picture and also the picture interaction dialogue associated with the picture. At least the dialogue and image files of set 44 are specifically associated with each other—that is, the association of these files is pre-specified (in advance of user interaction) with the contents of the dialogue file being specifically tailored to the picture represented by the image file of the same set 44.

User 2 has local picture-presentation equipment 37; in the present case, this equipment is standard processing platform, such as a PC or portable computer, arranged to run a graphical web browser such as Microsoft's Internet Explorer. Other implementations of the picture presentation equipment 37 can alternatively be provided such as a mobile phone with a graphical display and suitable programs.

The picture-presentation equipment 37 displays the picture image of the multi-modal picture on display 38 and also provides for the input and output audio data via audio functionality 39, this audio input and output being transferred to and from a voice browser 3 (here shown as located separately from the picture picture-presentation equipment—for example, a network-based voice browser—but alternatively, integrated with the picture-presentation equipment 37). The picture-presentation equipment also has an associated pointing arrangement 40 depicted in FIG. 7 as a mouse for controlling a cursor movable over the displayed picture image; other forms of pointing arrangements for selecting features of the picture image are, of course, also possible such as the use of touch pads, tracker balls or joysticks for moving an image cursor; touch-sensitive displays and other arrangements (such as a matrix of infra-red beams immediately overlying the display) for enabling a user to use a finger or stylus to point directly at a feature of the displayed image; etc.

The voice browser 3 comprises input channel 11, dialog manager 7 and output channel 12. The voice browser provides interactive dialog with the user, via the picture-presentation equipment 37, in respect of the currently-presented multi-modal picture, this dialog being in accordance with picture interaction dialog data retrieved from server 43.

The FIG. 7 voice browser 3, as well as providing for voice input and output exchanges with the picture-presentation equipment 37, is also arranged to receive input data from the equipment in the form of key, value pairs indicating, for example, the selection of a particular picture feature by the user using the pointing arrangement 40 of the picture-presentation equipment. This data input is used by the dialog manager 7 in determining the course of the dialog with the user. The voice browser 3 can also provide data back to the picture-presentation equipment 37.

The picture-presentation equipment 37, voice browser 3 and server 3 inter-communicate via any suitable communications infrastructure or direct links.

Considering in more detail the files involved in the presentation of a multi-modal picture, these comprise, in addition to the set 44 of files that specify a multi-modal picture, a set of generic files 51. The multi-modal picture files 44 comprise:
 the picture file 45, this file including a source reference for the picture image file 49 to be displayed and map data defining the image hotspots;
 a picture interaction dialog file 46 containing dialog scripts;
 one or more sound files 47, 48 (such as ".wav" files) containing audio data;
 the image file 49 (such as a ".jpg" or ".gif" file) containing the image data to be displayed.

The generic files 51 can be stored locally in the picture-presentation equipment 37 or retrieved from a remote location such as the server 43. The generic files comprise:
 a frame-set definition file 52 defining two frames 53, 54 into which page files can be independently loaded; one frame 53 is used to hold a file 55 containing control code (the contents of this frame not being visible), and the other frame 54 being used to hold the picture file 45 for the multi-modal picture to be presented.
 the control code file 55 to be loaded into frame 53, the control code being in the form of a number of scripts the main purpose of which is to provide key,value pairs to the voice browser according to events detected by the browser software run by the picture-presentation equipment 37—in particular, clicking on an image hotspot as defined in file 45 is arranged to trigger a corresponding script in the control code file 55 whereby to cause a corresponding key,value pair to be passed to the voice browser 3 to inform it that a particular picture feature (corresponding to the activated hotspot) has been selected by the user.

To use the generic files to present a particular multi-modal picture, it is necessary to provide a reference to the multi-modal picture. This reference can, for example, be manually input by the user into an initial form displayed in the image frame 54 and then used by a script to request the loading of a file into frame 54. Alternatively, the multi-modal picture reference can be included as data in a query string attached to the URL of the frame-set definition file 52 (this URL and query string being, for example, provided to the user by the author of the multi-modal picture); in this case, in response to a request for the frame-set definition file 52, server-side code could, for example, extract the data from the query string and place it in the file source reference in the definition line for frame 54 in the frame-set definition file before that file is returned to the user.

In the present example, the multi-modal picture reference used to initiate presentation of the multi-modal picture is a reference to the picture interaction dialog file 46 to be loaded into the voice browser, rather than a reference to the picture file 45 that is to be loaded into the image frame 54. Thus, the multi-modal picture reference, however obtained, is passed in a key,value pair to the voice browser 3; voice browser 3 thereupon retrieves the picture interaction dialog file 46 to the dialog manager 7 of the voice browser. The file 46 includes a reference to the picture image file 45 to be loaded into the frame 54 and this reference is returned to the picture-presentation equipment 37 where it is used to retrieve the picture file 45. Where the picture-presentation equipment 37 comprises a standard web browser, one way of achieving the above is to have the dialog file reference sent (either as a source reference in the frame-set definition file or by a script in, for example, file 55) to the voice browser in a request for a file to load into frame 54, the voice browser sending back the picture file reference as a redirection.

It will be appreciated that the multi-modal picture reference passed into the generic files could have been that of the picture file 45, the latter then being retrieved into frame 54 and including an "onLoad" event script for passing to the voice browser a reference to the interaction dialog file.

The various steps involved in presenting a multi-modal picture according to the FIG. 7 implementation are summarized below with reference to the reference numerals in square brackets in FIG. 7:

[1] the generic files 51 have been loaded into the picture-presentation equipment 37 and a multi-modal picture reference has been provided; as a result, a key,value pair including a reference to the picture interaction dialog file 46 is passed to the voice browser 3;

[2] voice browser retrieves the dialog file 46 from the server 43 and dialog manger 7 uses the file to control further interaction with the user;

[3] the first action taken by the dialog manager 7 under the control of dialog file 46 is to pass to the equipment the reference for the picture file 45 along with a voice greeting to the user;

[4] the picture file 45 (including a reference to the image file 49) is retrieved from server 43 and loaded into the image frame 54;

[5] the image file 49 is retrieved from the server 43 and displayed on display 38;

[6] meanwhile, the dialog manager 7 causes a sound (in sound file 47) to be played to the user to indicate that the picture is ready to receive user input (this sound can simply be an appropriate background sound such as, for the FIG. 6 picture image, the sound of the sea);

[7] the user queries the picture by voice input (and possibly also by pointing to a particular area of the picture, this being indicated by a corresponding key,value pair sent to the voice browser along with the user voice input);

[8] dialog manager 7 acknowledges the receipt of the user query by causing an acknowledgement sound (in sound file 48) to be played back to the user;

[9] the dialog manager 7, having determined the appropriate response to the user query, outputs this response.

Steps [8] and [9] are repeated as many times as required by the user. In due course the user asks to exit and the dialog is terminated by the dialog manager.

Figure 8:
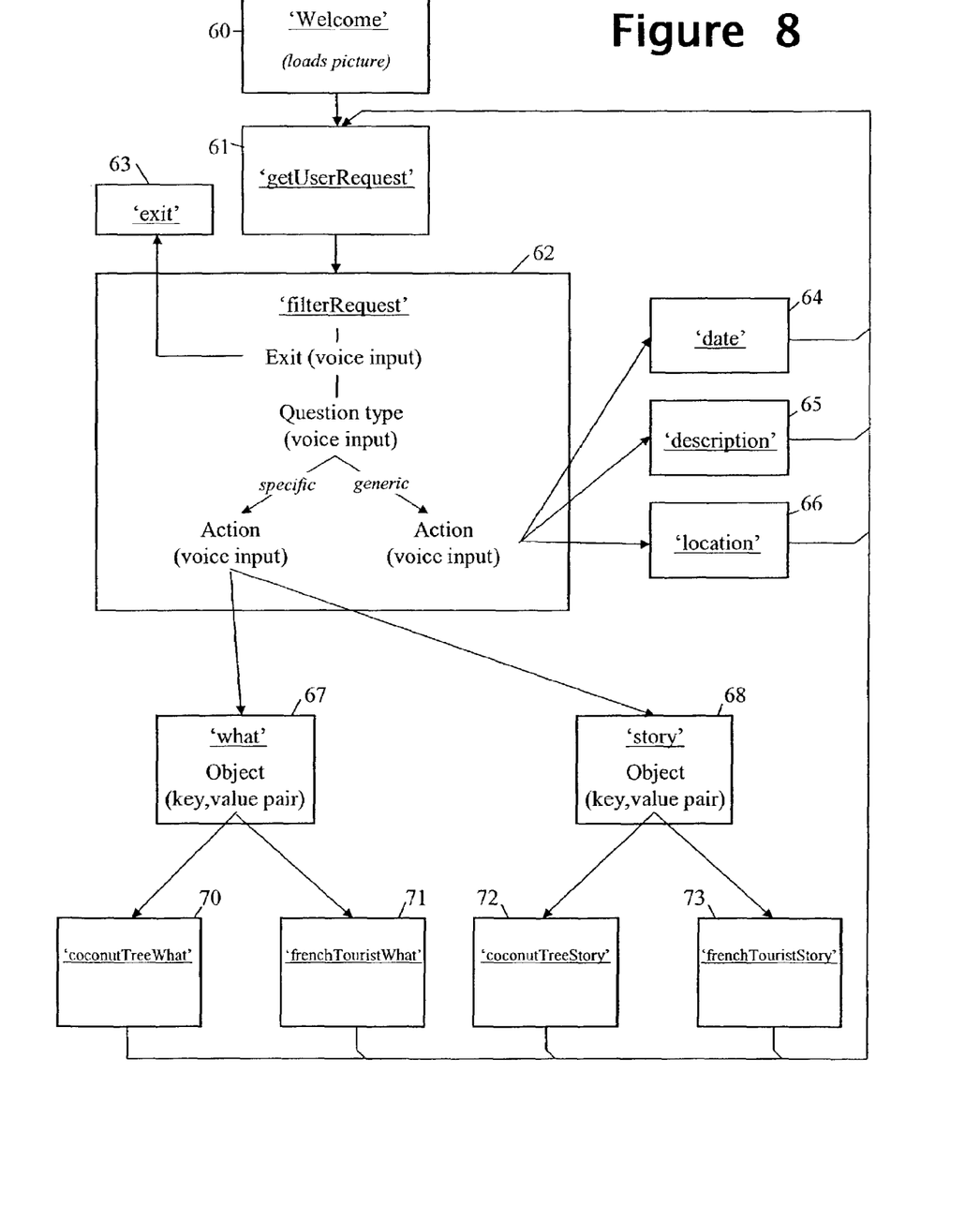
FIG. 8 is a diagram showing constituent dialog blocks of a picture interaction dialog file of the FIG. 6 multi-modal picture.

FIG. 8 illustrates the contents of the picture interaction dialog file 46. This file contains a number of dialog blocks 60 to 73 that contain dialog elements and/or control structures relating to dialog progression. Thus, dialog block 60 provides the initial greeting and causes the picture file reference to be passed to the equipment 37 (in step [3] above). Block 61 defines the query grammar and represents a waiting state for the dialog pending the receipt of a query from the user.

Block 62 carries out an analysis of a recognized query to determine whether it is an exit request (if so, an exit dialog block 63 is entered), a generic request, or a specific request; generic and specific requests are further analyzed to determine the nature of the query (that is, what "action"—type of information—is being requested). For a general query, the available actions are, in the present example, "date", "description", and "location; for a specific query, the action types are, in the present example, "what" and "story". Depending on the outcome of the action analysis, the dialog manager proceeds to one of blocks 64-66 (for a general query) or one of blocks 67 and 68 (for a specific query). The analysis carried out by dialog block 62 is on the basis of voice input only.

If the query was a general one, then block 64 is used to answer a date query, block 65 is used to respond to a description query, and block 66 is used to respond to a location query.

If the query was a specific "what" query, block 67 determines the identity of the picture feature (object) involved using the key,value pair provided to the voice browser; depending on the object identity, the dialog manager proceeds either to a "what" dialog block 70 for a coconut tree or to a "what" dialog block 71 for a French tourist. Similarly if the query was a specific "story" query, block 68 determines the identity of the picture feature (object) involved using the key,value pair provided to the voice browser; depending on the object identity, the dialog manager proceeds either to a "story" dialog block 72 for a coconut tree or to a "story" dialog block 73 for a French tourist.

After a response is provided by any one of the dialog blocks 64-66 or 70-73, the dialog manager returns to dialog block 61.

An example dialog interaction based on the FIG. 6 picture and the FIG. 8 dialog structure is given below; in this example, there is one narrator called Roger.

Example Interaction:

| | |
|---|---|
| System: | "This picture was sent to you by Guillaume. You can talk to Roger to ask for information about it." |
| User: | "Roger, Describe the picture" |
| System: | "This is a picture of the XYZ beach." |
| User: | "What is the location?" |
| System: | "This picture was taken in Martinique, an island located in the French West Indies." |
| User: | "What is it" [and clicks on feature 31] |
| System: | "This is a coconut tree. This kind of trees is very common in the Caribbean." |
| User: | "Any story?" |
| System: | "When I was little, I used to get coconuts from my garden. There is a sweet liquid inside that is very tasty. We use coconut to make ice creams and all sorts of nice desserts." |
| User: | "What is it?" [and clicks on 32] |
| System: | "I guess this is a French tourist" |
| User: | "Any story?" |
| System: | "Tourism is one of the main source of revenue in Martinique. A lot of people come from France when it is winter over there." |
| User: | "Exit" |
| System: | "Thanks for using this digital picture frame." |

The Appendix to the present description includes a detailed script example of the FIG. 8 dialog interaction as well as the HTML source of a picture file 45.

Multi-modal Picture Authoring Tool.

Figure 9:
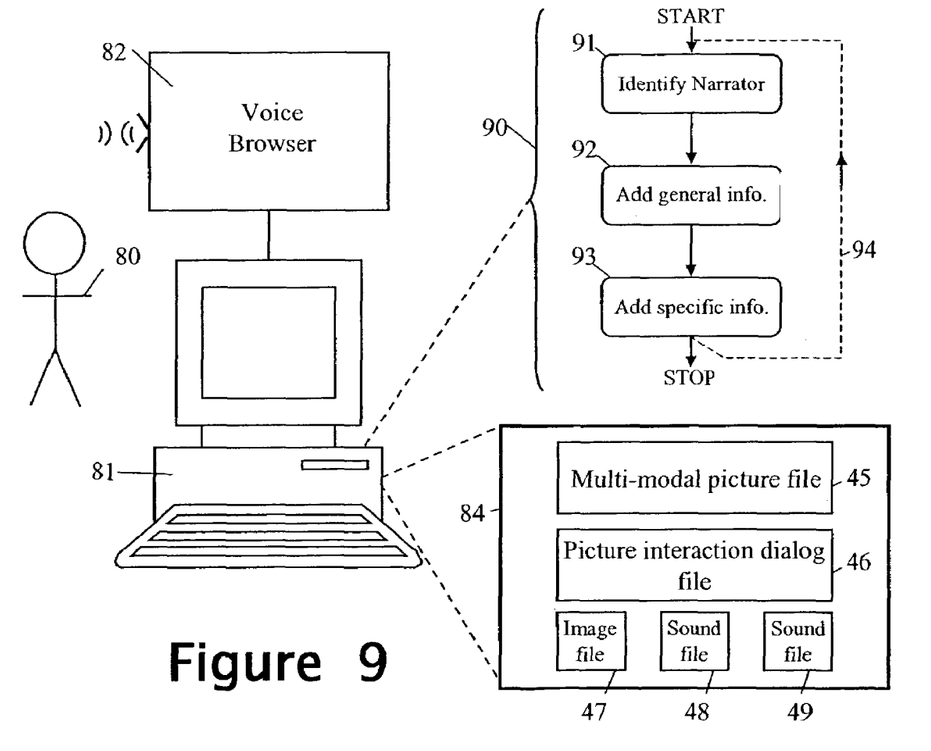
FIG. 9 is a diagram of apparatus for authoring a multi-modal picture.
Figure 10:
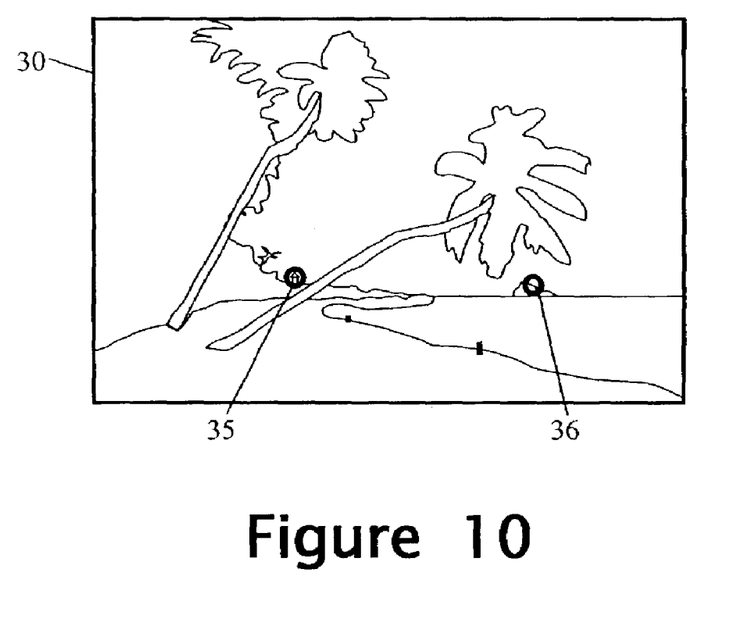
FIG. 10 shows, in respect of the FIG. 6 image, a user seeking information from two picture features for which there is no associated information.

FIG. 9 illustrates apparatus for enabling an author 80 to author a multi-modal picture. The apparatus comprises a computing platform 81 providing a graphical user interface and running a tool, such as Microsoft's FrontPage product, for authoring mark-up language pages and for creating image hotspot maps. The apparatus further comprises a speech interface system 82 (here shown as a voice browser though other forms of speech interface system can be used). The speech interface system 82 permits the author 80 to interact with the apparatus by voice and is set up to recognize command words such as "Record".

Different people, known as narrators, can author different aspects of the same picture. The apparatus keeps a record of narrators known to it.

The apparatus is arranged to interact with one or more narrators to build up, in memory, the set of files 44 that specify a multi-modal picture, it being assumed that the picture image file 47 around which the multi-modal picture is to be built has already been loaded into memory (for example, from a digital camera) and is displayed via the graphical user interface (GUI) of platform 81. The process of building the required files is controlled by a top-level authoring program 90 that has three main steps 91-93 as will be more fully explained below.

Identifying the Narrator—(step 91)

The first step of the authoring program is to identify the current narrator. The narrator speaks his/her name into the speech interface system 82; if the name is known to the apparatus, the system replies with a recognition greeting. However, if the narrator's name is not already known to the apparatus, the system asks the narrator to create a new profile (basically, input his/her name and any other required information), using appropriate data collection screens displayed on the graphical user interface of the computing platform 81.

Example: the apparatus knows the following names: "Lawrence" and "Marianne".

| | |
|---|---|
| Apparatus: | "What is your name?" |
| Narrator: | "Steve". |
| Apparatus: | "Sorry, I do not know this name, please write it down." |
| Narrator: | [inputs "Steve" via a data collection screen of the GUI]. |

The authoring program uses the narrator's name to customize a greeting dialog block of a template picture interaction dialog file 46.

Adding General Information About the Picture—(step 92)

After identification, the narrator can input general information concerning the picture image such as the date, the location or the description, via a spoken dialogue. In the following example, the command words recognized by the speech interface system 82 are shown in bold whilst the nature of information being recorded (corresponding to the query "action" type of FIG. 8) is indicated by underlining. The words indicating the nature of the information are either pre-designated to the system (effectively limiting the classification of information to be input) or else the system can be arranged to analyze narrator "Record" commands to determine the nature of the information to be recorded.

Example:

| | |
|---|---|
| Narrator: | "Record description" |
| Apparatus: | [Plays a beep]. |
| Narrator: | "This is a picture of me and John fishing in the Caribbean sea". [The apparatus records this input, either directly as sound data or as a text data after the input has been subject to speech recognition by the system 82] |
| Narrator: | "Write date". |
| Apparatus: | [displays date capture screen on GUI]. |
| Narrator: | [inputs date information via GUI]. |
| Narrator: | "Record story" |
| Apparatus: | [Plays a beep.] |
| Narrator: | "This day, John was attacked by a white shark." [The apparatus records this input] |

The authoring program uses the input from the narrator to create corresponding dialog blocks, similar to those described above with reference to FIG. 8, in dialog file 46.

Adding Specific Information—(step 93)

The narrator can also input information concerning a specific feature of the picture image. To do this, the narrator indicates the picture feature of interest by using the GUI to draw a "hotspot" boundary around the feature. The apparatus responds by asking the narrator to input a label for the feature via an entry screen displayed on the GUI. The authoring program uses the input from the narrator to create the multimedia picture file 45 holding an image hotspot map with appropriate links to the control code scripts.

The narrator can then enter further information using the speech interface system or the GUI. The narrator can record or write multiple descriptions or stories for a single area of the picture, for example, to give different level of details.

| | |
|---|---|
| Narrator: | "Record description". |
| Apparatus: | [Plays beep.] |
| Narrator: | "It is a whale" [The apparatus records this input] |
| Narrator: | "Record story" |
| Apparatus: | [Plays beep.] |
| Narrator: | "We saw this whale on the way to Dominica." [The apparatus records this input] |
| Narrator: | "Record next" (indicates that further details for the story are to be recorded). |
| Narrator: | "We were crossing the Guadeloupe channel when we saw it." [The apparatus records this input] |

Again, the authoring program uses the input from the narrator to create corresponding dialog blocks; thus, for the above example, where a "whale" hotspot has been designated by the user, the authoring program generates a set of dialogs blocks: 'whaleDescription', 'whaleStory1', 'whaleStory2', etc.

After the first narrator has finished inputting information, other narrators can enter information in the same manner.

User Feedback

It will be appreciated that the authoring of a multi-modal picture, and in particular the adding of the dialog data, can be quite involved. As a result, it is quite likely that the author will not always include information that a recipient may be interested in.

It is therefore useful to be able to monitor a user's interaction with a multi modal picture to see if the user tries to access missing information. For example, a user receives the FIG. 6 multi modal picture from a friend. Two objects 35,36 (a building and an island) in the picture image intrigues the user (see FIG. 9) who therefore clicks on each picture feature concerned and asks for more information ("What is it?"). Unfortunately, there are no hotspots associated with either picture feature and therefore in each case the voice browser comes back with the response "Sorry, there is no information about this item."

However, the coordinates corresponding to each picture feature the user clicked are known to the browser used to display the picture image and the control script (for example, in file 55) can be used to pass the coordinates as key,value pairs to the voice browser 3. At the same time, a user verbal query is also passed to the voice browser. The voice browser first determines whether the query is a general one and if it is, the voice browser ignores the received coordinate values; however, if the voice browser determines that the query is a specific one, then it determines from the key,value pairs received that the user has indicated a picture feature for which there is no corresponding information available. In this case, the voice browser logs the received coordinate values and the associated "action" type (in the example given above, "what" or "story") in a feedback file 50 that forms part of the set 44 of related files associated with the multimodal picture (see arrow 70 in FIG. 7). For example, upon the user clicking on the island feature 36 in FIG. 9 and asking "what is this?", the data (action='what'; coordx=400;coordy=300) is logged to file 50. Such logging functionality is, for example, provided by a further dialog block of FIG. 8. The logged coordinates provide, together with an indication of the picture concerned, a picture-feature identifier that identifies the picture feature about which information has been requested by the user.

Alternatively or additionally to logging the "desired-information" feedback data in file 50, the author of the multimodal picture can be sent a message (for example, an e-mail message) explaining the query from the user such as "John wants a description of this object.". This message includes a picture feature identifier that identifies the picture feature concerned. The picture feature identifier can take the form of explicit data items indicative of the picture concerned and the coordinates of the feature in the picture or may more directly indicate the feature by including either image data representing the relevant portion of the picture image or image data showing the picture image with a marking indicating the position in the image of the feature concerned (both such forms of picture-feature indication can also be included the feedback file 50 additionally or alternatively to the feature coordinates). The picture-feature indication need not be sent to the file 50 (or included in a message to the author) at the time the system detects that the user has asked for information about a non-hotspot picture feature; instead, the indication and related query can be temporarily stored and output, together with other accumulated similar indications and queries, either at a specified time or event (such as termination of viewing of the picture by the user) or upon request from the picture author.

The author can then decide whether or not to add in further information by adding an additional hotspot and additional dialogs (for example, using the above-described authoring apparatus).

Of course, the same general feedback process can be used where although a selected picture feature is associated with an existing hotspot, there is no existing query "action" corresponding to a user's query. Furthermore, a similar feedback process can be used where user queries are input by means other than speech (such as, for example, via a keyboard or by a hand-writing or stroke recognition system) and, indeed, where there are no explicit user queries such as when the selecting of picture feature is taken as a request for information about that feature.

Variants

Figure 11:
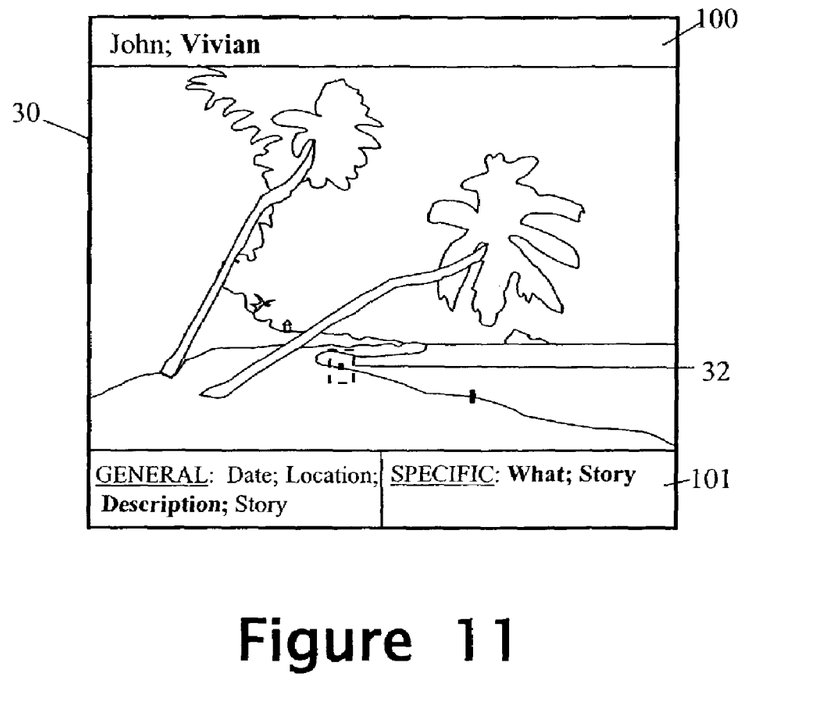
FIG. 11 shows the FIG. 6 picture image enhanced with upper and lower information bars.

Many variants are, of course, possible to the arrangements described above. For example, FIG. 11 illustrates a variant form of the multi-modal picture in which the picture image 30 is accompanied by upper and lower information bars 100 and 101 respectively. The upper information bar 100 indicates the narrators associated with the picture whilst the lower information bar 101 indicates what types of general and specific queries are available for use. These information bars assists the user in appreciating what queries can be put and to whom. To further assist the user, speaking (or clicking on) a narrator's name is preferably arranged to indicate what hotspots are associated with that narrator and where these hotspots are located in the image—thus, in FIG. 11, narrator "Vivian" has been selected and hotspot 32 is indicated on the picture image by a dashed hotspot boundary line. Query types used by "Vivian" can also be indicated by highlighting these types (in the FIG. 11 example, "Vivian" has used general query type 'description' and specific query types 'what' and 'story').). Preferably, once a narrator has been selected, that narrator remains selected until a different (or all) narrators is subsequently selected, whereby with a narrator selected, only the responses of that narrator will be used in responding to the users' queries. However, it is also possible to arrange for selection of a narrator to be effective only for a single query. In this latter case, a convenient way of providing for user selection of a narrator to answer a query about a particular feature is for a list of narrators of responses about that feature to be displayed whenever the user points to that feature.

Instead of identifying narrators by name as shown in FIG. 11, other forms of identifier can be used such as an image of each narrator.

As regards the generic control code, this can be provided in the form of a Java applet or any other suitable form and is not limited to the use of client-side scripts of the form described above. Furthermore, rather than the frame-set definition file 52 and control code file 55 being generic in form, they can be made specific to each multi-modal picture.

As already indicated, picture invocation can be initiated in a variety of ways. As a further example, picture invocation can be arranged to be effected by the creator sending the user a reference to the picture interaction dialog file, the user sending this reference to the voice browser to enable the latter to retrieve the dialog file; the dialog file is arranged to cause the return to the user of the frame-set definition file (or a reference to it) with the latter already including the correct source reference to the picture file as well as to the control code file.

Persons skilled in the art will appreciate that there are very many ways of implementing multi-modal pictures and the supporting functionality ranging from the multiple file approach described above to having just a single data file containing all the necessary data and arranged to be executed by specifically adapted software. It will also be appreciated that whilst in the described embodiments the course of the system-user interaction is controlled by the control logic embedded in the picture interaction dialog file and interpreted by the dialog manager 7 of the voice browser, it is possible to provide this functionality separate from the voice browser and the response scripts (thus, in general terms, the dialog block 62, 67 and 68 would be used by a separate control arrangement for determining, on the basis of the user voice and pointing-arrangement inputs, which of multiple stored responses is the appropriate one to play back to the user). Furthermore, it is not necessary to explicitly identify a selected feature from the coordinates output by the pointing arrangement as a separate step to choosing an appropriate response to a particular user query; thus, a picture feature could simply be specified in the control logic of the dialog interaction file by its coordinate values (of range of values) whereby this control logic tests coordinate values output by the pointing arrangement against coordinate values of particular features in the course of selecting a response to a user query.

With respect to the selection of a picture feature of interest to a user, in the described embodiments this has been carried out by means of a user-operated pointing arrangement whereby data input about the picture feature of interest is generated through a manual operation. In addition to the described arrangements for manually effecting feature selection, it is possible to use an arrangement in which the coordinates of the feature of interest are manually input using a keypad (a coordinate system being displayed as part of the image presented to the user, or being presented around the boundary of the display area). Another possible feature-selection arrangement is one based on specifying, via keypad input, a particular area of the display where either the display is divided into labelled areas or there is a direct mapping between keypad keys and display areas. It is also possible to label each feature of interest in the image with a reference and have the user effect feature selection by keypad input of the appropriate reference.

Further as regards the determination of which picture feature is being selected by a user, it should be noted that determining the picture feature of interest from the image coordinates or image area identified by whatever selection arrangement is being used, can be done in ways other than that described above in which image coordinates generated by the feature-selection arrangement are mapped to picture features using predetermined mapping data as described above. For example, the image can have data encoded into it that labels particular picture features, the pointing arrangement being arranged to read this label data when over the corresponding picture feature. Technology for embedding auxiliary data in picture image data in a way that does not degrade the image for the average human viewer is already known in the art.

The picture image can be a hard-copy image carrying markings (such as infra-red ink markings) intended to be read by a sensor of a suitable pointing arrangement whereby to determine what particular picture feature is being pointed to; the markings can be a pattern of markings enabling the pointing arrangement to determine the position of its sensor on the image (in which case, an image map can be used to translate the coordinates into picture features) or the markings can be feature labels appropriately located on the image. Even without special markings added to the image, the image can still be a hard-copy image provided the image is located in a reference position relative to which the pointing arrangement can determine the position of a pointing element (so that an image map can be used to translate pointing-element position into picture features). Other manually-operated selection arrangements, such as those based on explicit coordinate input via a keypad, can also be used.

Where image map data is used to translate image coordinates to picture features, the image map data can be held separately from the picture file and only accessed when needed; this facilitates updating of the image map data. A reference (e.g. URL) to the image map data can be included in the picture file or, where the image is a hard-copy image, in markings carried by the image.

Preferably, the described embodiments are applied to pictures of scenes and places in the real world such as a tourist might take with a camera. However, it is also possible to apply the embodiments to topographic pictures that are primarily intended to convey map-type information.

Appendix

This Appendix forms an integral part of the description.

Example of Multi-Modal Picture File.

The following HTML file was generated using Microsoft FrontPage and is the Multi-Modal Picture file 45 for the picture depicted in FIG. 6; the HTML code pulls in image file "beachPicture.jpg" and defines three "hotspots" which when clicked result in a call to a function (method) of the control code file 55 with the passing of a parameter value indicating which hotspot has been clicked on.

```
File Name: MMPicture1.htm
<html>
<head>
<meta http-equiv="Content-Type" content="text/html;
charset=windows-1252">
<meta name="GENERATOR" content="Microsoft FrontPage 4.0">
<meta name="ProgId" content="FrontPage.Editor.Document">
<title>Frame Page</title>
</head>
<body>
<p><map name="FPMap0">
<area href="http://localhost/mmpic1/dpfBlank.htm"
onclick="parent.parent.scriptFrame.pushParams('object=coconutTree')"
target="invisible" coords="128, 84, 253, 236" shape="rect">
<area href="http://localhost/mmpic1/dpfBlank.htm"
onclick="parent.parent.scriptFrame.pushParams('object=frenchTourist')"
target="invisible" shape="rect" coords="204, 266, 219, 282">
<area href="http://localhost/mmpic1/dpfBlank.htm"
onclick="parent.parent.scriptFrame.pushParams('object=frenchTourist')"
target="invisible" shape="rect" coords="309, 257, 324, 269"></map>
<img border="0" src="beachPicture.jpg" align="center"
usemap="#FPMap0"
width="569" height="375"></p>
</body>
</html>
```

Example of Picture Interaction Dialogue File

The following is an example implementation of the FIG. 8 picture interaction dialog file 46. In this example, there is one narrator called Roger. The user can say things like: "Roger, what is the date?".

```
<talkml>
    <!--variables declaration-->
    <create name="object"        expr="'undefined'"/>
    <create name="action"        expr="'what'"/>
    <create name="type"          expr="'generic'"/>
    <!-- Specify here the url of the display webserver-->
    <display-server url="localhost"/>
    <dialog name="welcome">
        <say>Welcome to the digital picture frame.</say>
        <!-- Display the Multi Modal picture of beach. -->
        <display-show url="MMPicture1.htm"/>
        <say>
            This picture was sent to you by Guillaume. You can talk to
            Roger to ask for information about it.
        </say>
        <goto next="getUserRequest"/>
    </dialog>
    <dialog name="getUserRequest">
        <play src="sound1.wav"/>
        <display-listen wait_after="2000"/>
        <speech wait_after="2000">
            sentence = narrator question | question | exit {action=
            'exit'};
            question = genericQuestion {type='generic'}
            | specificQuestion
                {type='specific'};
            narrator = roger {narrator='roger'};
            roger    = "roger";
            genericQuestion = date {action='date'}| location {action=
            'location'}|
                        description {action='description'};
            date     = "what is the date";
            location = "what is the location";
            description = "describe the picture";
            specificQuestion= what {action='what'} | story {action=
            'story'};
            what     = "what is it";
            story    = "any story";
            exit     = "exit";
        </speech>
        <recognised>
            <play src="sound2.wav"/>
            <goto next="filterRequest"/>
        </recognised>
        <unrecognised>
            <play src="sound2.wav"/>
            <say> I am sorry, I have some trouble understanding
            you.</say>
            <retry/>
        </unrecognised>
    </dialog>
    <dialog name="filterRequest">
        <if cond="action='exit'">
            <goto next="exit"/>
        </if>
        <if cond="type='generic'">
            <if cond="action='description'"><goto next=
            "description"/></if>
            <if cond="action='date'"><goto next="date"/></if>
            <if cond="action='location'"><goto next="location"/></if>
        </if>
        <if cond="type='specific'">
            <if cond="action='what'">   <goto next="what"/> </if>
            <if cond="action='story'">  <goto next="story"/></if>
        </if>
    </dialog>
    <dialog name="description">
        <say>
            This is a picture of the beach.
        </say>
        <goto next="getUserRequest"/>
    </dialog>
    <dialog name="date">
        <say>
            Guillaume took this picture during his last trip home to
            Martinique last November
        </say>
        <goto next="getUserRequest"/>
    </dialog>
    <dialog name="location">
        <say>
            This picture was taken in Martinique, an island located in
            the French West Indies.
        </say>
        <goto next="getUserRequest"/>
    </dialog>
    <dialog name="=what">
        <if cond="object='coconutTree'"><goto next=
        "coconutTreeWhat"/></if>
        <if cond="object='frenchTourist'"><goto next=
        "frenchTouristWhat"/></if>
        <say>
            Apparently, you did not click on any parts of the picture.
            Try again.
        </say>
        <goto next="getUserRequest"/>
    </dialog>
    <dialog name="story">
        <if cond="object='coconutTree'"><goto next=
        "coconutTreeStory"/></if>
        <if cond="object='frenchTourist'"><goto next=
        "frenchTouristStory"/></if>
        <say>
            Apparently, you did not click on any parts of the picture.
            Try again.
        </say>
        <goto next="getUserRequest"/>
```

-continued

```
    </dialog>
    <dialog name="frenchTouristWhat">
        <say>
            I guess this is a French tourist.
        </say>
        <goto next="getUserRequest"/>
    </dialog>
    <dialog name="coconutTreeWhat">
        <say>
            This is a coconut tree. This kind of trees is very common in
            the Caribbean.
        </say>
        <goto next="getUserRequest"/>
    </dialog>
    <dialog name="frenchTouristStory">
        <say>
            Tourism is one of the main source of revenue in
            Martinique. A lot of people come from France when it is
            winter over there.
        </say>
        <goto next="getUserRequest"/>
    </dialog>
    <dialog name="coconutTreeStory">
        <say>
            When I was little, I used to get coconuts from my garden.
            There is a sweet liquid inside that is very tasty. We use
            coconut to make ice creams and all sorts of nice desserts.
        </say>
        <goto next="getUserRequest"/>
    </dialog>
    <dialog name="exit">
        <say>Thanks for using this digital picture frame. </say>
    </dialog>
</talkml>
```

The invention claimed is:

1. A method of collecting user-interest information regarding a picture, the method comprising the steps of:
    (a) presenting a picture image to a display for a user, particular picture features in the image each having associated information that is presented to the user upon the user requesting such information;
    (b) recognising a user information request, in respect of a picture feature, made by the user at least selecting that picture feature using a feature-selection arrangement; and
    (c) in response to recognition of a user information request in step (b) concerning a picture feature that is other than a said particular picture feature, outputting an identifier of the concerned picture feature independently of the presented image.

2. A method according to claim 1, wherein in step (b) the recognition of a user information request in respect of a picture feature involves recognising, not only the selection of that picture feature by the user using the feature-selection arrangement, but also the input of a query;
    step (c) involving the output of an indication of the user-input query in association with the picture-feature identifier.

3. A method according to claim 2, wherein the query is input by speech.

4. A method according to claim 2, further comprising the step of using the picture-feature identifier and query indication output in step (c) to make the corresponding picture feature a said particular picture feature with associated information, intended to respond to the query indicated by said query indication, that is presented to the user upon the user requesting such information.

5. A method according to claim 1, wherein the picture feature identifier comprises an indication of the picture concerned and image coordinates of the picture feature.

6. A method according to claim 1, wherein the picture image is generated from digital data, the picture-feature identifier being digital data representing a corresponding portion of the image.

7. A method according to claim 1, wherein the picture image is generated from digital data, the picture-feature identifier being digital data representing the image with a marking indicating the position of the feature in the image.

8. A method according to claim 1, wherein the said identifier of step (c) is temporarily stored and subsequently output.

9. A method according to claim 1, wherein the said identifier of step (c) is output to a log file.

10. A method according to claim 1, wherein the said identifier of step (c) is output in the form of an electronic message addressed to a person associated with the generation of the picture and its associated information.

11. A method according to claim 1, further comprising the step of using the picture-feature identifier output in step (c) to make the corresponding picture feature a said particular picture feature with associated information that is presented to the user upon the user requesting such information.

12. A method according to claim 1, wherein use of the said feature-selection arrangement to select a picture feature results in the picture image coordinates of the feature being compared against an image map mapping coordinate values to said particular picture features.

13. A method according to claim 12, wherein said image map is held in a separate file whereby to facilitate updating to specify additional particular picture features.

14. A method according to claim 1, wherein said selection arrangement is a pointing arrangement usable by the user to point to a feature of interest in the picture image.

15. A method according to claim 1, wherein said image is rendered on the display from digital image data.

16. A method according to claim 1, wherein the picture image is operable to be generated as a hard-copy image.

17. A system for collecting user-interest information regarding a picture, the system comprising:
    a data store for holding information concerning particular picture features;
    a feature-selection arrangement for enabling a user to select a feature in a displayed view of the picture, and for providing an output indication regarding what said particular feature, if any, the user has thereby selected; an information-output subsystem for outputting information about picture features to the user;
    a control arrangement for recognising a user information request, in respect of a picture feature, made by the user at least selecting that picture feature using the feature-selection arrangement, the control arrangement including:
    first output means arranged to respond to a user making an information request concerning a said particular feature, by outputting the corresponding stored information via the information-output subsystem; and second output means arranged to respond to a user making an information request concerning a picture feature that is other than a said particular picture feature, by outputting an identifier of the concerned picture feature for informing an author of the picture or its associated information regarding the unsatisfied information request.

18. A system according to claim 17, further comprising a query-input subsystem by which a user can input a query concerning a selected picture feature, the control arrangement being arranged to recognize a user information request in respect of a picture feature by recognising, in association with the selection of that picture feature by the user using the feature-selection arrangement, the input of a query by the user; the second output means being arranged to output an indication of the user-input query in association with the picture-feature identifier.

19. A system according to claim 18, wherein the query-input subsystem and the information output subsystem are formed by a speech input-output arrangement including a speech recogniser.

20. A system according to claim 18, further comprising apparatus for using the identifier and query indication to make said concerned picture feature a said particular picture feature with associated information intended to respond to the query indicated by said query indication.

21. A system according to claim 17, wherein the said second output means is arranged to temporarily store said identifier for subsequent output.

22. A system according to claim 17, wherein the said second output means is arranged to output the said identifier to a log file.

23. A system according to claim 17, wherein the said second output means is arranged to output the said identifier in the form of an electronic message addressed to said author.

24. A system according to claim 17, further comprising apparatus for using the identifier to make said concerned picture feature a said particular picture feature with associated information.

25. A system according to claim 17, further comprising a display for rendering said image from digital image data.

26. A system according to claim 17, further comprising means for registering a hard-copy image of said picture in predetermined relation to the feature-selection arrangement.

27. A system according to claim 17, wherein said selection arrangement is a pointing arrangement usable by the user to point to a feature of interest in a displayed view of the picture.

* * * * *